(12) United States Patent
Humphrey

(10) Patent No.: US 11,386,255 B2
(45) Date of Patent: Jul. 12, 2022

(54) PARAMETER EXTRACTION FROM DIGITIZED IMAGE OF A SCHEMATIC OR BLOCK DIAGRAM FOR ELECTRICAL DESIGNS

(71) Applicant: TEXAS INSTRUMENTS INCORPORATED, Dallas, TX (US)

(72) Inventor: Malcolm James Humphrey, Pleasanton, CA (US)

(73) Assignee: Texas Instruments Incorporated, Dallas, TX (US)

( * ) Notice: Subject to any disclaimer, the term of this patent is extended or adjusted under 35 U.S.C. 154(b) by 96 days.

(21) Appl. No.: 17/067,975

(22) Filed: Oct. 12, 2020

(65) Prior Publication Data

US 2021/0027006 A1 Jan. 28, 2021

Related U.S. Application Data

(63) Continuation of application No. 16/175,478, filed on Oct. 30, 2018, now Pat. No. 10,810,342.

(60) Provisional application No. 62/611,921, filed on Dec. 29, 2017.

(51) Int. Cl.
*G06F 30/398* (2020.01)

(52) U.S. Cl.
CPC .................................. *G06F 30/398* (2020.01)

(58) Field of Classification Search
CPC .................................................. G06F 17/5081
USPC ......................................................... 716/119
See application file for complete search history.

(56) References Cited

U.S. PATENT DOCUMENTS

| | | | |
|---|---|---|---|
| 6,530,065 B1 * | 3/2003 | McDonald | G06F 30/367 716/136 |
| 6,877,033 B1 * | 4/2005 | Garrett | G06Q 30/02 716/139 |
| 7,409,666 B2 * | 8/2008 | Almeida | G06F 30/39 716/137 |
| 7,966,588 B1 | 6/2011 | Perry et al. | |
| 8,332,789 B2 | 12/2012 | Perry et al. | |
| 8,676,559 B2 * | 3/2014 | Sethuraman | G06F 30/33 716/111 |
| 10,102,320 B2 * | 10/2018 | Pataky | G06F 30/327 |
| 10,810,342 B2 * | 10/2020 | Humphrey | G06F 30/398 |
| 2009/0282379 A1 * | 11/2009 | Singh | G06F 30/30 716/110 |

(Continued)

FOREIGN PATENT DOCUMENTS

WO WO2014068770 A1 * 9/2016

*Primary Examiner* — Suresh Memula
(74) *Attorney, Agent, or Firm* — Brian D Graham; Charles A. Brill; Frank D. Cimino

(57) ABSTRACT

Capturing and processing a digital image of a pictorial (e.g., hand-drawn) representation of a schematic or block diagram as a digital image to aid in creation and maintenance of electrical designs is disclosed. Processing of the digital image includes processing to determine design parameters to create an informational format useful as input to other design software. Design parameters may include schematic layout and attributes such as maximum output voltage, minimum input voltage, ambient temperature, etc. The method and system also include storage of information accessible to refine designs and perform simulations of designs as part of an overall electrical design process. Associated devices and methods are disclosed as well.

20 Claims, 3 Drawing Sheets

(56) References Cited

U.S. PATENT DOCUMENTS

| | | | |
|---|---|---|---|
| 2012/0221990 A1* | 8/2012 | Dai | G06F 30/367 |
| | | | 716/112 |
| 2016/0253445 A1* | 9/2016 | Pataky | G06F 30/327 |
| | | | 716/104 |
| 2019/0012424 A1* | 1/2019 | Brookshire | H05K 3/0005 |
| 2019/0102489 A1* | 4/2019 | Chawda | G06F 30/327 |

* cited by examiner

PARAMETER EXTRACTION FROM DIGITIZED IMAGE OF A SCHEMATIC OR BLOCK DIAGRAM FOR ELECTRICAL DESIGNS

CROSS-REFERENCE TO RELATED APPLICATIONS

This application is a continuation of U.S. patent application Ser. No. 16/175,478, filed Oct. 30, 2018, which claims priority to U.S. Provisional Patent App. No. 62/611,921, filed Dec. 29, 2017, each of which is incorporated herein by reference in its entirety.

BACKGROUND

Currently, engineers may be assisted in making electrical designs and selecting from available circuits by typing information into a design tool from a web browser interface. One example design tool is WEBENCH® from Texas Instruments (WEBENCH is a registered trademark of Texas Instruments). Using this type of interface, a user would type in numerical information describing parameters of a circuit and the design engine portion of the design tool would present possible circuitry from already available chips and boards. As explained in the documentation of WEBENCH, WEBENCH Design Environments are unique and powerful software tools that deliver customized power, lighting, filtering, clocking and sensing designs in seconds. These easy-to-use tools help you generate, optimize and simulate designs that conform to your unique specifications. They allow you to make value-based tradeoffs at a design, system and supply chain level before your design is committed to production.

However, typing parameters into a browser is more tuned to a desktop environment than a mobile device. Further the full web browser may not be as convenient to use or as omnipresent as mobile devices such as smart phones. To solve this and other problems, an interface using an image capture device may provide an easier and more flexible initial front-end while also providing an opportunity for nearly instant user delivery in a team or collaborative environment such as a conference room whiteboard discussion. Accordingly, examples disclosed herein address this and other issues to assist in extracting design parameters from a digitized image of a schematic or block diagram for electrical designs.

SUMMARY

In a first example, a digital image capture device, is disclosed. The digital image capture device includes: a memory; a processing device communicatively coupled to the memory; a user interface screen communicatively coupled to the processing device and the memory; and a network communication interface communicatively coupled to the memory and the processing device. The memory stores instructions that when executed by the processing device cause the processing device to: access a digital image representation of a picture captured by the digital image capture device, the picture depicting an electrical design and one or more design parameters; initiate transmission, via the network communication interface, of the digital image to a backend server for processing, the processing including extraction of the one or more design parameters; receive information from the backend server identifying an electrical design consistent with the one or more design parameters; and present a representation of the identified electrical design on the user interface screen.

In another example, a computer system is disclosed. The computer system includes: a memory; a processing device communicatively coupled to the memory; and a network communication interface communicatively coupled to the memory and the processing device. In this example, the memory stores instructions that when executed by the processing device cause the processing device to: receive, via the network communication interface from a remote device, a digital image representation of a picture captured by a digital image capture device, the picture depicting an electrical design and one or more design parameters; process the digital image to extract the one or more design parameters; identify an electrical design consistent with the one or more design parameters from a catalog of existing electrical designs; and send, via the network communication interface to the remote device, information from the backend server identifying an electrical design consistent with the one or more design parameters.

In yet another example, a non-transitory computer readable medium (CRM) is disclosed. The CRM includes instructions stored thereon that when executed by a processing device cause the processing device to: receive, via a network communication interface from a remote device, a digital image representation of a picture captured by a digital image capture device, the picture depicting an electrical design and one or more design parameters; process the digital image to extract the one or more design parameters; identify an electrical design consistent with the one or more design parameters from a catalog of existing electrical designs; and send, via the network communication interface to the remote device, information identifying an electrical design consistent with the one or more design parameters.

BRIEF DESCRIPTION OF THE DRAWINGS

For a detailed description of various examples, reference will now be made to the accompanying drawings in which.

DETAILED DESCRIPTION

In the following description, for purposes of explanation, numerous specific details are set forth in order to provide a thorough understanding of the examples disclosed herein. It will be apparent, however, to one skilled in the art that the disclosed example implementations may be practiced without these specific details. In other instances, structure and devices are shown in block diagram form in order to avoid obscuring the disclosed examples. Moreover, the language used in this disclosure has been principally selected for readability and instructional purposes, and may not have been selected to delineate or circumscribe the inventive subject matter, resorting to the claims being necessary to determine such inventive subject matter. Reference in the specification to "one example" or to "an example" means that a particular feature, structure, or characteristic described in connection with the examples is included in at least one implementation.

The term "computing system" is generally taken to refer to at least one electronic computing device that includes, but is not limited to, a single computer, virtual machine, virtual container, host, server, laptop, and/or mobile device or to a plurality of electronic computing devices working together to perform the function described as being performed on or by the computing system.

As used herein, the term "medium" refers to one or more non-transitory physical media that together store the contents described as being stored thereon. Examples may include non-volatile secondary storage, read-only memory (ROM), and/or random-access memory (RAM).

As used herein, the terms "application" and "function" refer to one or more computing modules, programs, processes, workloads, threads and/or a set of computing instructions executed by a computing system. Example implementations of applications and functions include software modules, software objects, software instances and/or other types of executable code. Note, the use of the term "application instance" when used in the context of cloud computing refers to an instance within the cloud infrastructure for executing applications (e.g., for a customer in that customer's isolated instance).

Figure 1:
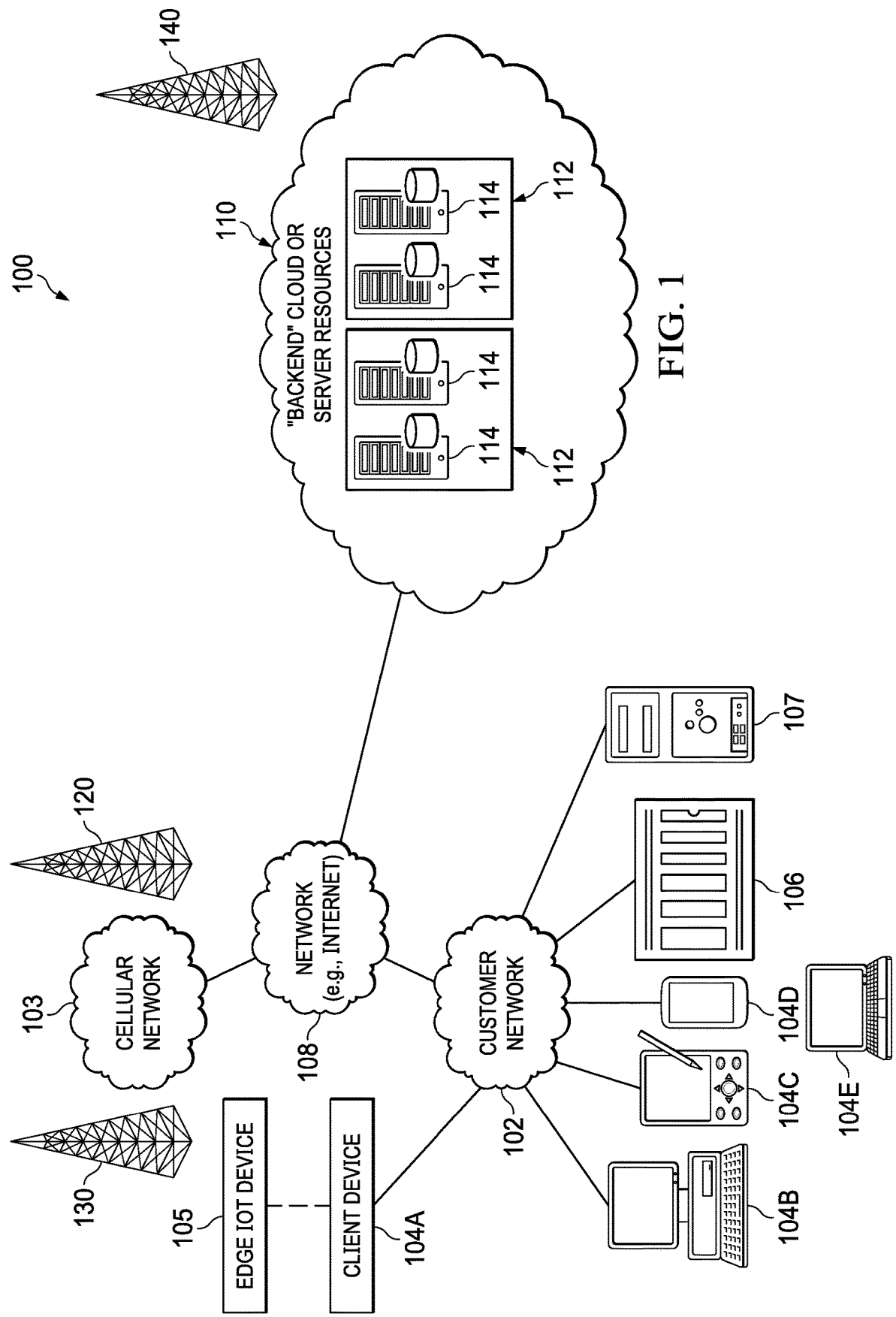
FIG. 1 illustrates a block diagram of an example of a networked computing infrastructure 100 where implementations of the present disclosure may operate.

FIG. 1 illustrates a block diagram of an example of a networked computing infrastructure 100 where implementations of the present disclosure may operate. Networked computing infrastructure 100 comprises a customer network 102, network 108, and a "backend" cloud or server resources platform/network 110. In one example, the customer network 102 may be a local private network, such as local area network (LAN) that includes a variety of network devices that include, but are not limited to switches, servers, and routers. Each of these networks can contain wired or wireless programmable devices and operate using any number of network protocols (e.g., TCP/IP) and connection technologies (e.g., WiFi® networks, Bluetooth®). Wi-Fi is a registered trademark of the Wi-Fi Alliance. Bluetooth is a registered trademark of Bluetooth Special Interest Group. In another example, customer network 102 represents an enterprise network that could include or be communicatively coupled to one or more local area networks (LANs), virtual networks, data centers, and/or other remote networks (e.g., 108, 112). As shown in FIG. 1, customer network 102 may be connected to one or more client devices 104A-E and allow the client devices to communicate with each other and/or with backend cloud or server resources platform/network 110. Client devices 104A-E may be computing systems such as desktop computer 104B, tablet computer 104C, mobile phone 104D, laptop computer (shown as wireless) 104E, and/or other types of computing systems generically shown as client device 104A. Networked computing infrastructure 100 may also include other types of devices generally referred to as Internet of Things (IoT) (e.g., edge IOT device 105) that may be configured to send and receive information via a network to access cloud computing services or interact with a remote web browser application (e.g., to receive configuration information). FIG. 1 also illustrates that customer network 102 may be connected to a local compute resource 106 that may include a server, access point, router, or other device configured to provide for local computational resources and/or to facilitate communication amongst networks and devices. For example, local compute resource 106 may be one or more physical local hardware devices configured to communicate with wireless network devices and/or facilitate communication of data between customer network 102 and other networks such as network 108 and backend cloud or server resources platform/network 110. Local compute resource 106 may also facilitate communication between other external applications, data sources, and services, and customer network 102. FIG. 1 also illustrates that customer network 102 may be connected to a computer configured to execute a management, instrumentation, and discovery (MID) server 107. For example, MID server 107 may be a Java application that runs as a Windows service or UNIX daemon. MID server 107 may be configured to assist functions such as, but not necessarily limited to, discovery, orchestration, service mapping, service analytics, and event management. MID server 107 may be configured to perform tasks for a cloud-based instance while never initiating communication directly to the cloud-instance by utilizing a work queue architecture. This configuration may assist in addressing security concerns by eliminating that path of direct communication initiation.

Networked computing infrastructure 100 also includes cellular network 103 for use with mobile communication devices. Mobile cellular networks support mobile phones and many other types of mobile devices such as laptops etc. Mobile devices in networked computing infrastructure 100 are illustrated as mobile phone 104D, laptop 104E, and tablet 104C. A mobile device such as mobile phone 104D may interact with one or more mobile provider networks as the mobile device moves, typically interacting with a plurality of mobile network towers 120, 130, and 140 for connecting to the cellular network 103. Although referred to as a cellular network in FIG. 1, a mobile device may interact with towers of more than one provider network, as well as with multiple non-cellular devices, such as wireless access points and routers (e.g., local compute resource 106). In addition, the mobile devices may interact with other mobile devices or with non-mobile devices such as desktop computer 104B and various types of client devices 104A for desired services. Although not specifically illustrated in FIG. 1, customer network 102 may also include a dedicated network device (e.g., gateway or router) or a combination of network devices that implement a customer firewall or intrusion protection system.

FIG. 1 illustrates that customer network 102 is coupled to a network 108. Network 108 may include one or more computing networks available today, such as other LANs, wide area networks (WANs), the Internet, and/or other remote networks, in order to transfer data between client devices 104A-E and backend cloud or server resources platform/network 110. Each of the computing networks within network 108 may contain wired and/or wireless programmable devices that operate in the electrical and/or optical domain. For example, network 108 may include wireless networks, such as cellular networks in addition to cellular network 103. Wireless networks may utilize a variety of protocols and communication techniques (e.g., Global System for Mobile Communications (GSM) based cellular network) wireless fidelity Wi-Fi networks, Bluetooth, Near Field Communication (NFC), and/or other suitable radio-based networks as would be appreciated by one of ordinary skill in the art upon viewing this disclosure. Network 108 may also employ any number of network communication protocols, such as Transmission Control Protocol (TCP) and Internet Protocol (IP). Although not explicitly shown in FIG.

1, network 108 may include a variety of network devices, such as servers, routers, network switches, and/or other network hardware devices configured to transport data over networks.

In FIG. 1, backend cloud or server resources platform/network 110 is illustrated as a remote network (e.g., a cloud network) that is able to communicate with client devices 104A-E via customer network 102 and network 108. Backend cloud or server resources platform/network 110 acts as a platform that provides additional computing resources to the client devices 104A-E and/or customer network 102. For example, by utilizing backend cloud or server resources platform/network 110, users of client devices 104A-E may be able to build and execute applications, such as automated processes for various enterprise, IT, and/or other organization-related functions. In one example, backend cloud or server resources platform/network 110 includes one or more data centers 112, where each data center 112 could correspond to a different geographic location. Within a particular data center 112 a cloud service provider may include a plurality of server instances 114. Each server instance 114 may be implemented on a physical computing system, such as a single electronic computing device (e.g., a single physical hardware server) or could be in the form a multi-computing device (e.g., multiple physical hardware servers). Examples of server instances 114 include, but are not limited to, a web server instance (e.g., a unitary Apache installation), an application server instance (e.g., unitary Java Virtual Machine), and/or a database server instance (e.g., a unitary MySQL catalog).

To utilize computing resources within backend cloud or server resources platform/network 110, network operators may choose to configure data centers 112 using a variety of computing infrastructures. In one example, one or more of data centers 112 are configured using a multi-tenant cloud architecture such that a single server instance 114, which can also be referred to as an application instance, handles requests and serves more than one customer. In some cases, data centers with multi-tenant cloud architecture commingle and store data from multiple customers, where multiple customer instances are assigned to a single server instance 114. In a multi-tenant cloud architecture, the single server instance 114 distinguishes between and segregates data and other information of the various customers. For example, a multi-tenant cloud architecture could assign a particular identifier for each customer in order to identify and segregate the data from each customer. In a multitenancy environment, multiple customers share the same application, running on the same operating system, on the same hardware, with the same data-storage mechanism. The distinction between the customers is achieved during application design, thus customers do not share or see each other's data. This is different than virtualization where components are transformed, enabling each customer application to appear to run on a separate virtual machine. Generally, implementing a multi-tenant cloud architecture may have a production limitation, such as the failure of a single server instance 114 causing outages for all customers allocated to the single server instance 114.

In another example, one or more of the data centers 112 are configured using a multi-instance cloud architecture to provide every customer its own unique customer instance. For example, a multi-instance cloud architecture could provide each customer instance with its own dedicated application server and dedicated database server. In other examples, the multi-instance cloud architecture could deploy a single server instance 114 and/or other combinations of server instances 114, such as one or more dedicated web server instances, one or more dedicated application server instances, and one or more database server instances, for each customer instance. In a multi-instance cloud architecture, multiple customer instances could be installed on a single physical hardware server where each customer instance is allocated certain portions of the physical server resources, such as computing memory, storage, and processing power. By doing so, each customer instance has its own unique software stack that provides the benefit of data isolation, relatively less downtime for customers to access backend cloud or server resources platform/network 110, and customer-driven upgrade schedules.

Figure 2:
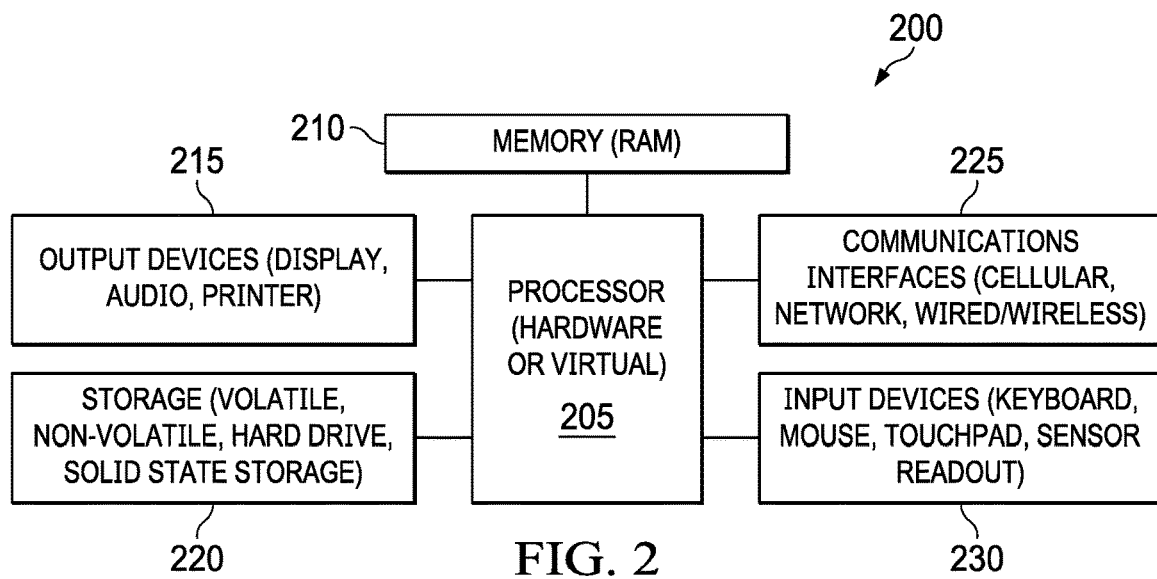
FIG. 2 illustrates a high-level block diagram 200 of a processing device (computing system) that may be used to configure one or more disclosed implementations.

FIG. 2 illustrates a high-level block diagram 200 of a processing device (computing system) that may be used to implement one or more disclosed examples (e.g., a service provider cloud infrastructure such as backend cloud or backend server resources 110, client devices 104A-104E, server instances 114, data centers 112, etc.). For example, computing device 200, illustrated in FIG. 2, could represent a client device or a physical server device and could include either hardware or virtual processor(s) depending on the level of abstraction of the computing device. In some instances (without abstraction) computing device 200 and its elements as shown in FIG. 2 each relate to physical hardware and in some instances one, more, or all of the elements could be implemented using emulators or virtual machines as levels of abstraction. In any case, no matter how many levels of abstraction away from the physical hardware, computing device 200 at its lowest level may be implemented on physical hardware. As also shown in FIG. 2, computing device 200 may include one or more input devices 230, such as a keyboard, mouse, touchpad, or sensor readout (e.g., biometric scanner) and one or more output devices 215, such as displays, speakers for audio, or printers. Some devices may be configured as input/output devices also (e.g., a network interface or touchscreen display). Computing device 200 may also include communications interfaces 225, such as a network communication unit that could include a wired communication component and/or a wireless communications component, which may be communicatively coupled to processor 205. The network communication unit may utilize any of a variety of proprietary or standardized network protocols, such as Ethernet, TCP/IP, to name a few of many protocols, to effect communications between devices. Network communication units may also comprise one or more transceivers that utilize the Ethernet, power line communication (PLC), Wi-Fi, cellular, and/or other communication methods.

As illustrated in FIG. 2, processing device 200 includes a processing element, such as processor 205, that contains one or more hardware processors, where each hardware processor may have a single or multiple processor cores. In one example, the processor 205 may include at least one shared cache that stores data (e.g., computing instructions) that are utilized by one or more other components of processor 205. For example, the shared cache may be a locally cached data stored in a memory for faster access by components of the processing elements that make up processor 205. In some cases, the shared cache may include one or more mid-level caches, such as level 2 (L2), level 3 (L3), level 4 (L4), or other levels of cache, a last level cache (LLC), or combinations thereof. Examples of processors include, but are not limited to a central processing unit (CPU) microprocessor. Although not illustrated in FIG. 2, the processing elements that make up processor 205 may also include one or more other types of hardware processing components, such as graphics processing units (GPUs), application specific integrated circuits (ASICs), field-programmable gate arrays (FPGAs), and/or digital signal processors (DSPs).

FIG. 2 illustrates that memory 210 may be operatively and communicatively coupled to processor 205. Memory 210 may be a non-transitory medium configured to store various types of data. For example, memory 210 may include one or more storage devices 220 that comprise a non-volatile storage device and/or volatile memory. Volatile memory, such as random access memory (RAM), can be any suitable non-permanent storage device. The non-volatile storage devices 220 can include one or more disk drives, optical drives, solid-state drives (SSDs), tap drives, flash memory, read-only memory (ROM), and/or any other type memory designed to maintain data for a duration time after a power loss or shut down operation. In certain instances, the non-volatile storage devices 220 may be used to store overflow data if allocated RAM is not large enough to hold all working data. The non-volatile storage devices 220 may also be used to store programs that are loaded into the RAM when such programs are selected for execution.

Persons of ordinary skill in the art are aware that software programs may be developed, encoded, and compiled in a variety of computing languages for a variety of software platforms and/or operating systems and subsequently loaded and executed by processor 205. In one instance, the compiling process of the software program may transform program code written in a programming language to another computer language such that the processor 205 is able to execute the programming code. For example, the compiling process of the software program may generate an executable program that provides encoded instructions (e.g., machine code instructions) for processor 205 to accomplish specific, non-generic, particular computing functions.

After the compiling process, the encoded instructions may then be loaded as computer executable instructions or process steps to processor 205 from storage 220, from memory 210, and/or embedded within processor 205 (e.g., via a cache or on-board ROM). Processor 205 may be configured to execute the stored instructions or process steps in order to perform instructions or process steps to transform the computing device into a non-generic, particular, specially programmed machine or apparatus. Stored data, e.g., data stored by a storage device 220, may be accessed by processor 205 during the execution of computer executable instructions or process steps to instruct one or more components within the computing device 200.

A user interface (e.g., output devices 215 and input devices 230) can include a display, positional input device (such as a mouse, touchpad, touchscreen, or the like), keyboard, or other forms of user input and output devices. The user interface components may be communicatively coupled to processor 205. When the output device is or includes a display, the display can be implemented in various ways, including by a liquid crystal display (LCD) or a cathode-ray tube (CRT) or light emitting diode (LED) display, such as an OLED display. Persons of ordinary skill in the art are aware that the computing device 200 may comprise other components well known in the art, such as sensors, powers sources, and/or analog-to-digital converters, not explicitly shown in FIG. 2.

Figure 3:
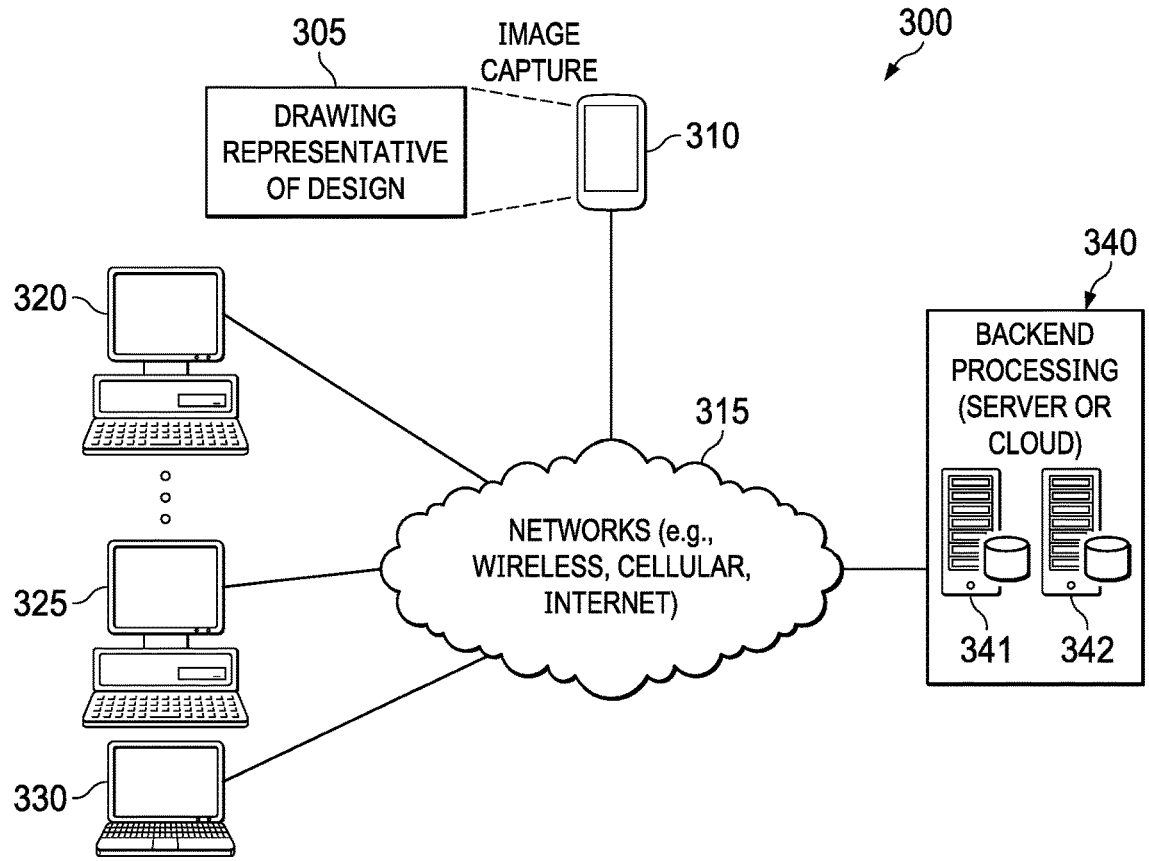
FIG. 3 illustrates a block diagram 300 of image capture and computing devices configured to derive information from a drawing of a circuit captured as a digital image according to one or more disclosed implementations.

Referring now to FIG. 3, block diagram 300 illustrates a possible configuration of a) components used to perform image capture of a drawing representative of an electrical design, and b) computing devices configured to derive information from a drawing of a circuit captured as a digital image, according to one or more disclosed examples. Beginning at block 305 a drawing representative of an electrical design is fixed on a medium such as a whiteboard or paper. For example, a group of engineers may be in a conference room (or some other type of meeting) and discussing a potential solution with the aid of a drawing. For purposes of this disclosure, a "drawing" refers to something drawn by a person with or without the aid of a computer, and an "image" refers to a picture taken with a digital image capture device 310 (e.g., a mobile phone). After the drawing reaches a certain stage of completeness and includes notations depicting parameters such as minimum input voltage, maximum output voltage, output voltage, load current, and optionally other key design parameters such as ambient temperature, image capture device 310 takes a snapshot of the drawing to create a digital image. Image capture device 310 may be connected to one or more networks 315 to allow communication of the digital image representing the drawing to be transmitted to additional servers for processing (e.g., backend processing server or cloud 340) and storage (e.g., on disks communicatively coupled to servers 341 or 342). Of course, some local processing of the digital image may occur prior to transmission from image capture device 310. Any number of workstation type computers may also be communicatively coupled to networks 315 as illustrated by laptop 330 and desktops 320 through 325. In this manner, the drawing may be made available, via the digital image, to any number of computers for long term storage or further processing as explained below with reference to flow chart 400. Technologies used to process a digital image to extract design information and parameters include, but are not limited to, optical character recognition (OCR), natural language processing (NLP), pattern recognition, schematic processing software, handwriting recognition. As a result, a drawing may be captured and processed to extract design parameters for electrical designs according to one or more disclosed examples. This operation may represent a useful initial step to begin using additional software executing on other computers to perform simulations and fine tune a proposed design.

In some implementations there may be processing performed for drawn symbols on the picture that represent a macro definition of a component. Both standard and potentially short-hand (even non-standard) symbols may be used. For example, instead of diagramming a switching power supply and including industry-standard symbols with correctly placed schematic entries for the Inductor, input capacitors, and output capacitors, the entire arrangement may be represented with a single symbol (black box) with the appropriate input and desired output parameters. The image capture and recognition process may be configured to interpret this simpler representation and create an accurate circuit with all the necessary components.

Figure 4:
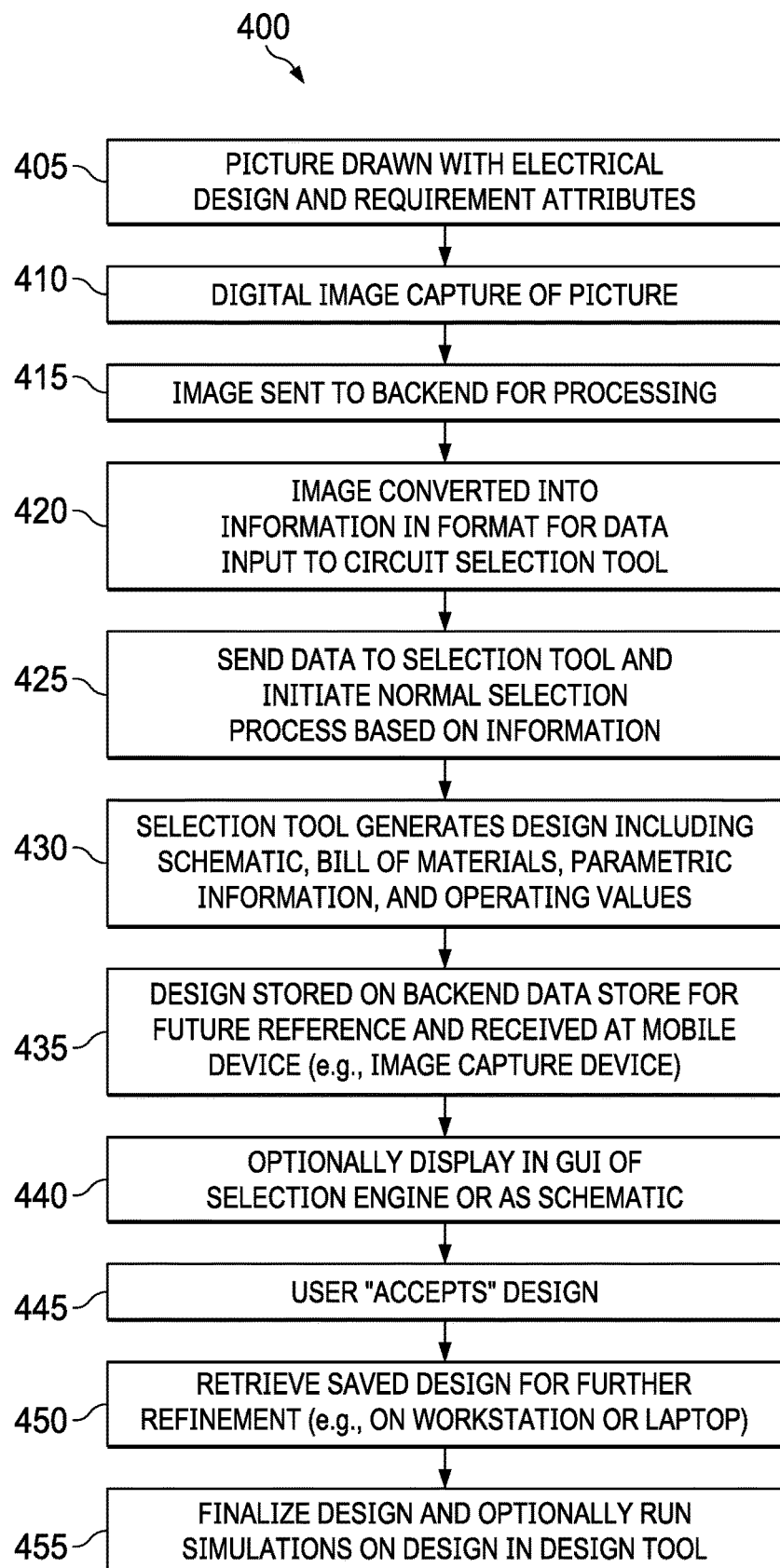
FIG. 4 illustrates a flow chart 400 depicting one possible method for capturing and processing a digital image of a schematic drawing to facilitate circuit selection according to one or more disclosed implementations.

Referring now to FIG. 4, flow chart 400 illustrates one possible method for capturing and processing a digital image of a schematic drawing to facilitate circuit selection according to one or more disclosed examples. Beginning at block 405 a picture is drawn of an electrical design schematic including design requirement parameters as attributes. At block 410, a digital image of the drawn picture is captured. Block 415 indicates that the image may be sent to a backend server for processing (possibly after some initial local processing). Block 420 indicates that the image may be converted into information and formatted for input to a circuit selection tool. Information may be extracted by recognition of key symbols in the drawing and using techniques discussed herein including OCR. Block 425 indicates that data may be sent to a selection tool (e.g., WEBENCH) and normal selection processing of that tool may be initiated based on the information derived from the digital image. Block 430 indicates that the selection tool may generate a design including a schematic, bill of materials, parametric information, and operating values. Block 435 indicates that the design may be stored on a backend data store for future reference and information about the design may be received at the mobile device. For example, the image capture device in the conference room where the original picture was drawn. Block 440 indicates that the derived design may be displayed in the GUI of the selection engine, as a schematic, or possibly as output from a mobile device application. Block 445 indicates that a user "accepts" the design. That is, provides an indication, possibly through the GUI, that the design matches at least some information from the drawing. Block 450 indicates that a saved design may be later retrieved for further refinement. This refinement may take place on a workstation or laptop computer running software that may not be available on the original mobile device. Block 455 indicates that the user may finalize the design and optionally run simulations of the design, using the design tool for example.

With the above understanding, one use case example could be as presented here. A user draws a power supply tree or a single power supply or other analog design with requirements on a white board, napkin or paper. The user takes a picture of the diagram with a mobile device which can capture images. The image may be sent to a server for processing. Software on the server and/or mobile device converts the image into a format which can be used by a tool to suggest a power supply or other analog solution. Software would extract parameters such as minimum input voltage, maximum input voltage, output voltage, load current and optionally other key design parameters such as ambient temperature. This parameter data may be fed into a selection engine which would automatically select a power supply or other analog solution that best fits the user's requirements (i.e., matches drawing information). A design synthesis engine may then generates a design including a schematic and bill of materials along with associated parametric information and operating values. The design may be sent to the mobile device and displayed to the user via a graphical user interface (GUI). The design may also be stored in a temporary area on a server. The user (e.g., customer) may opt to "accept" the design, for example, by using a GUI control on the display device. Acceptance may cause the design to be saved (e.g., on a server) for later access by the user. The design could be stored in a password protected area on the server which would require that the user be logged into the system in order to access the design at another time. The user could then perform operations on the design such as open the design and view critical design parameters, run electrical and thermal simulations, get a printed report or share the design with others using features such as are present in the WEBENCH or related tools.

Certain terms have been used throughout this description and claims to refer to particular system components. As one skilled in the art will appreciate, different parties may refer to a component by different names. This document does not intend to distinguish between components that differ in name but not function. In this disclosure and claims, the terms "including" and "comprising" are used in an open-ended fashion, and thus should be interpreted to mean "including, but not limited to . . . ." Also, the term "couple" or "couples" is intended to mean either an indirect or direct wired or wireless connection. Thus, if a first device couples to a second device, that connection may be through a direct connection or through an indirect connection via other devices and connections. The recitation "based on" is intended to mean "based at least in part on." Therefore, if X is based on Y, X may be a function of Y and any number of other factors.

At least one example implementation is disclosed and variations, combinations, and/or modifications of the example(s) and/or features of the example(s) made by a person having ordinary skill in the art are within the scope of the disclosure. Alternative implementations that result from combining, integrating, and/or omitting features of the example(s) are also within the scope of the disclosure. The above discussion is meant to be illustrative of the principles and various examples of the present disclosure. Numerous variations and modifications will become apparent to those skilled in the art once the above disclosure is fully appreciated. It is intended that the following claims be interpreted to embrace all such variations and modifications.

What is claimed is:

1. A device comprising:
a processing device; and
a non-transitory computer-readable memory coupled to the processing device and storing instructions that when executed cause the processing device to:
receive an image that includes a set of electrical design symbols;
for each symbol of the set of electrical design symbols, determine a corresponding circuit element to determine a set of circuit elements associated with the image;
generate a circuit that includes the set of circuit elements based on the image; and
provide a schematic of the circuit.

2. The device of claim 1, wherein the non-transitory computer-readable memory stores instructions that cause the processing device to:
determine a bill of materials associated with the circuit; and
provide the bill of materials.

3. The device of claim 1, wherein:
the image includes a representation of a set of design parameters; and
the non-transitory computer-readable memory stores instructions that cause the processing device to:
determine the set of design parameters from the representation; and
generate the circuit based on the set of design parameters.

4. The device of claim 3, wherein the set of design parameters includes at least one of: a minimum input voltage, a maximum input voltage, an output voltage, a load current, or a ambient temperature.

5. The device of claim 1 further comprising a network interface, wherein the non-transitory computer-readable memory stores instructions that cause the processing device to:
receive the image from a user device via the network interface; and
provide the schematic of the circuit to the user device via the network interface.

6. The device of claim 1, wherein the instructions are configured to be executed by a web services interface.

7. The device of claim 1, wherein the instructions are configured to be executed by an instance implemented in a cloud infrastructure.

8. The device of claim 1, wherein the set of electrical design symbols includes at least one of: a ground symbol, a battery symbol, a resistor symbol, a capacitor symbol, an attenuator symbol, an inductor symbol, a power supply symbol, a power tree symbol, or a power source symbol.

9. A method comprising:
receiving, by a computing device, a digital image that includes a set of electrical design symbols;
determining, by the computing device, a set of circuit elements that corresponds to the set of electrical design symbols;
generating, by the computing device, a circuit that includes the set of circuit elements based on the digital image; and
generating, by the computing device, a schematic of the circuit.

10. The method of claim 9 further comprising:
determining a bill of materials associated with the circuit; and
providing the bill of materials.

11. The method of claim 9, wherein:
the digital image includes a representation of a set of design parameters; and
the method further comprises:
determining the set of design parameters from the representation; and
generating the circuit based on the set of design parameters.

12. The method of claim 11, wherein the set of design parameters includes at least one of: a minimum input voltage, a maximum input voltage, an output voltage, a load current, or a ambient temperature.

13. The method of claim 11, wherein the set of electrical design symbols includes at least one of: a ground symbol, a battery symbol, a resistor symbol, a capacitor symbol, an attenuator symbol, an inductor symbol, a power supply symbol, a power tree symbol, or a power source symbol.

14. The method of claim 11, wherein:
the receiving of the digital image receives the digital image from a user device via a network; and
the method further comprises providing the schematic of the circuit to the user device via the network.

15. The method of claim 14, wherein the user device includes a mobile device.

16. A device comprising:
a processing device;
a network interface coupled to the processing device; and
a non-transitory computer-readable memory coupled to the processing device and storing instructions that when executed cause the processing device to:
receive an image that includes a set of electrical design symbols;
provide the image to a server via the network interface;
receive, from the server, a schematic of a circuit corresponding to the image that includes a set of circuit elements that correspond to the set of electrical design symbols via the network interface; and
cause the schematic to be displayed.

17. The device of claim 16, wherein the device is a mobile device.

18. The device of claim 16, wherein:
the image includes a representation of a set of design parameters; and
the circuit is based on the set of design parameters.

19. The device of claim 18, wherein the set of design parameters includes at least one of: a minimum input voltage, a maximum input voltage, an output voltage, a load current, or a ambient temperature.

20. The device of claim 16, wherein the set of electrical design symbols includes at least one of: a ground symbol, a battery symbol, a resistor symbol, a capacitor symbol, an attenuator symbol, an inductor symbol, a power supply symbol, a power tree symbol, or a power source symbol.

* * * * *